Figure 1:
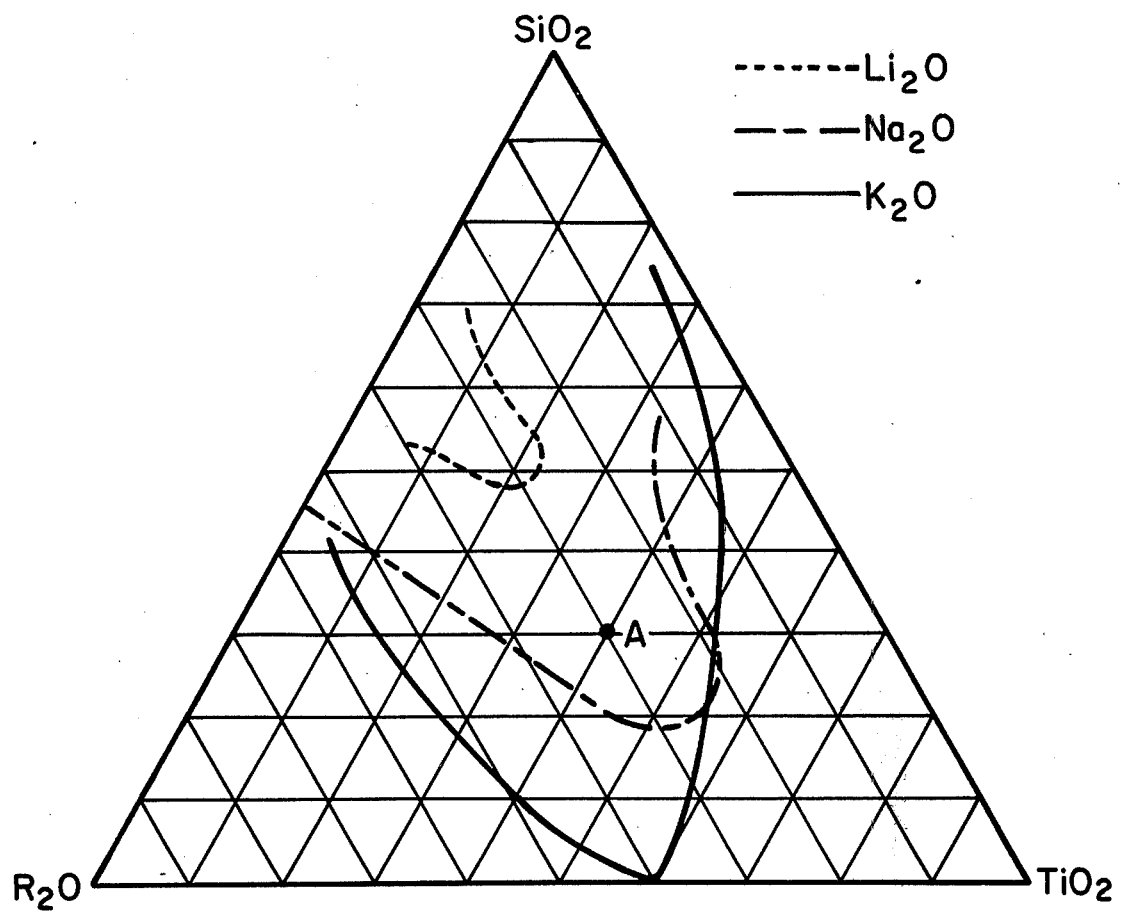

United States Patent [19]

Elmer et al.

[11] 4,009,318
[45] Feb. 22, 1977

[54] LAMINATED GLASS BODY WITH OPAL PHASE PRODUCED BETWEEN LAMINAE

[75] Inventors: Thomas H. Elmer, Corning; Arthur E. Hillman, Elmira; Karl E. Hoekstra; Robert G. Howell, both of Corning; Herbert E. Rauscher, Painted Post; Charles C. Smith, Jr., Corning, all of N.Y.

[73] Assignee: Corning Glass Works, Corning, N.Y.

[22] Filed: Nov. 15, 1974

[21] Appl. No.: 523,959

[52] U.S. Cl. .............................. 428/420; 428/426; 428/428
[51] Int. Cl.² .................... B32B 7/04; B32B 17/06
[58] Field of Search ........... 161/1, 188, 193; 65/33, 65/145; 313/220; 428/420, 426, 428

[56] References Cited
UNITED STATES PATENTS

| | | | |
|---|---|---|---|
| 3,223,501 | 12/1965 | Fredley et al. ..................... | 65/25 A |
| 3,445,316 | 5/1969 | Megles .................................. | 161/1 |
| 3,504,819 | 4/1970 | Veres .................................. | 313/220 |
| 3,597,305 | 8/1971 | Giffen .................................. | 161/193 |
| 3,673,049 | 6/1972 | Giffen et al. ..................... | 161/165 X |
| 3,737,294 | 6/1973 | Dumbaugh et al. ................. | 65/33 |
| 3,779,856 | 12/1973 | Pirooz .................................. | 65/33 |
| 3,790,430 | 2/1974 | Mochel ................................ | 161/1 |
| 3,849,097 | 11/1974 | Giffen et al. ...................... | 65/33 |

Primary Examiner—Marion E. McCamish
Assistant Examiner—William R. Dixon, Jr.
Attorney, Agent, or Firm—Clinton S. Janes, Jr.; Clarence R. Patty, Jr.

[57] ABSTRACT

The instant invention relates to the production of composite glass articles involving the bringing together of two or more glasses, while in the molten state, into an integral unit. More particularly, the present invention is concerned with the manufacture of such articles wherein a reaction occurs at the interface between the laminae of molten glass such that an opal phase is spontaneously produced in situ thereat.

14 Claims, 3 Drawing Figures

LAMINATED GLASS BODY WITH OPAL PHASE PRODUCED BETWEEN LAMINAE

It is well-recognized in the lighting art and, particularly in the field of incandescent lamp envelopes, that a "frosted" appearance is very desirable. This frosted appearance acts to mask the lighting filaments but does not substantially reduce the transmission of light through the envelope. Currently, the frosting is secured through etching the glass envelope with a fluoride-containing solution. However, in view of the known adverse effect of fluoride upon the environment and the present massive governmental and private commitments to reduce the level of air and water pollution, considerable research has been conducted to discover a method for simulating the appearance of frosting but wherein a fluoride solution would not be involved.

Therefore, the principal objection of the instant invention (although the invention is obviously not limited thereto) is to provide means for producing thin-walled glass bodies having an opacity simulating the frosting of incandescent lamp envelopes.

Opal glasses are well-known to the consumer, their principal utility being in the decorative, culinary, and dinner ware fields. Such glasses can vary in light transmitting capabilities from the faintly translucent to the deeply opaque. Experimentation has been undertaken in the past wherein an opal glass was employed as the glass envelope for an incandescent lamp. The results of those experiments have not been completely rewarding, principally in three respects: (1) the difficulty in securing homogeneous opalization in the thin-walled envelope; (2) the fact that, when the opalization has been sufficiently dense to mask out the lighting filaments, the transmittance of visible radiation has been severely reduced; and (3) variations in wall thickness resulting from the method of manufacture of the envelopes, i.e., air blown on a high speed "ribbon" machine, have led to inhomogeneous transmittance of visible radiations.

We have found that the principal objective of this invention as cited above can be achieved in laminated bodies wherein two or more glasses are combined, while in the molten state, into an integral unit. The glass compositions are so chosen that a reaction will take place at the interface between laminae which causes an opal phase to spontaneously develop thereat in situ.

U.S. Pat. Nos. 3,597,305, 3,673,049, and 3,737,294 disclose the production of laminated glass and/or glass-ceramic articles by bringing together streams of molten glass such that the final composite body will have defect-free interfaces between the laminae. The laminae exhibit different coefficients of thermal expansion such that the overall inherent improvement in mechanical strength resulting from the presence of surface compression layers can be enjoyed. However, there is no discussion of any reaction taking place at the interface between the different laminae.

In discussing glasses which can react together to produce spontaneous opalization at the interface therebetween, an understanding of the mechanisms which can underlie the reaction is believed to be of importance. In general, two basic mechanisms are postulated to be at work. The first consists of an ion exchange reaction taking place between certain cations in the two glasses. The second consits of a straigthforward diffusion reaction wherein an ion of one glass will migrate into the structure of the second glass. Glasses which can form the reaction couple have been broken down into two main categories. First, there is the base glass in which the desired opalization is developed in situ. Second, there is the source or sink glass which either provides the source of cations for combining with the constituents of the base glass or furnishes a drain for cations out of the base glass.

As has been explained above, the desired practice contemplates the opalization reaction being spontaneous, i.e., the reaction takes place during the forming of the glasses into a laminated body or during the cooling of the so-formed composite article. In other words, there is no necessity to subject the composite article to a subsequent heat treatment to induce the opalization.

Discussing first the base glass compositions, it has been found that the operable species can be classified into five general systems: (1) $Na_2O$ and/or $K_2O$-RO-$SiO_2$; (2) $Na_2O$ and/or $K_2O$-$TiO_2$-$SiO_2$; (3) $Na_2O$ and/or $K_2O$-$AL_2O_3$-$SiO_2$; (4) $Na_2O$ and/or $K_2O$-CaO-$SiO_2$-F; and (5) $Na_2O$ and/or $K_2O$-$B_2$-$O_3$-$SiO_2$-F. The last two categories contain fluoride which is contrary to the desires expressed above with respect to environmental protection. However, the presence of fluoride appears to enhance the opalization formation in certain compositions and the fluoride volatilized from the molten batch can be cleaned from the stack such that it does not pollute the atmosphere. Hence, fluoride can be considered a practical glass component.

The operable source or sink glass compositions can be classified into two broad areas: (1) lithium silicate glasses and (2) alkali metal-free silicate glasses. Referring back to the two reaction mechanisms involved, the lithium-containing glasses act as a source of $Li^+$ ions which exchange with the $Na^+$ and $K^+$ ions. In contrast, the alkali metal-free glasses have structures which permit molecular diffusion therein from the base glass.

In the succeeding working examples, glasses were melted and composite articles formed in two different manners. The primary melting schedule employed was 1500° C. for 4 hours in platinum crucibles although the temperature was reduced when visual observations indicated very high fluidity of the melt or excessive volatilization therefrom, and increased when the batches were difficult to melt or too viscous at 1500° C. Occasionally, the glass compositions were melted overnight but this was done primarily from more efficient use of the experimental melting facilities rather than for any processing problem.

Three types of products were made from the melts. Thus, laminated cane was drawn utilizing the conventional double-gather technique. Further, composite buttons were prepared by pouring one glass into a mold and then pouring a second glass on top of the first while the latter is still in the molten state. Triple layer buttons were formed with one glass comprising the bottom and top layers and another glass the core portion. Finally, hand blown, triple-gathered incandescent lamp envelopes were also made.

In general, the most desirable product will consist of transparent glass laminae with opalization solely at the interface. Such is obviously the case with incandescent lamp envelopes. However, other applications will not require that feature so the development of an opal phase at the interface of glass layers, at least one of which is an opal glass, can also be useful.

Base glasses in the $Na_2O$ and/or $K_2O$-RO-$SiO_2$ systems, wherein RO consists of CaO, SrO, and/or BaO, can form spontaneous interface reaction opal phases with either a lithium-containing source glass or an alkali-free sink glass. Although individual amounts of $Na_2O$ and/or $K_2O$, RO, and $SiO_2$ will vary somewhat depending upon the presence of CaO, SrO, and BaO, the compositions, expressed in weight percent on the oxide basis, will range generally between about 2.5–25% $Na_2O$ and/or $K_2O$, 2.5–45% RO, and 50–85% $SiO_2$. Where CaO comprises the RO member, operable compositions consist essentially of about 5–20% $Na_2O$ and/or $K_2O$, 2.5–25% CaO, and 60–85% $SiO_2$. Where SrO comprises the RO member, operable compositions consist essentially of about 2.5–25% $Na_2O$ and/or $K_2O$, 2.5–35% SrO, and 55–85% $SiO_2$. Where BaO comprises the RO member, operable compositions consist essentially of about 2.5–25% $Na_2O$ and/or $K_2O$, 2.5–45% BaO, and 50–85% $SiO_2$.

Whereas the inclusion of MgO in substantive amounts appears to inhibit the desired interface reaction, other ingredients which behave compatibly with the base glass components can be added in amounts up to about 20% total. Such additions can include $Al_2O_3$, $B_2O_3$, $P_2O_5$, PbO, ZnO, CdO, and $ZrO_2$. It will be appreciated, of course, that the amounts of individual additions will be dependent upon the base glass composition and the physical properties desired in the lamina involved. Such decisions, however, are believed well-within the ingenuity of the worker in the glass art.

Table I reports a number of compositions employed as base glasses in the $Na_2O$ and/or $K_2O$-RO-$SiO_2$ system utilizing the melting and forming procedures described above. The compositions are tabulated in weight percent on the oxide basis. Nevertheless, it will be appreciated that the actual batch ingredients employed can be any materials, either the oxides or other compounds, which, when melted together, will be converted into the desired oxide in the proper proportions.

TABLE I

| | Weight Percent Oxide Composition | | | | | | | | |
|---|---|---|---|---|---|---|---|---|---|
| | 1 | 2 | 3 | 4 | 5 | 6 | 7 | 8 | 9 |
| $SiO_2$ | 73.0 | 71.0 | 73.0 | 76.0 | 78.0 | 82.0 | 82.0 | 86.0 | 62.0 |
| $Na_2O$ | 7.0 | 9.0 | 12.0 | 9.0 | 12.0 | 8.0 | 13.0 | 9.0 | 6.4 |
| CaO | 20.0 | 20.0 | 15.0 | 15.0 | 10.0 | 10.0 | 5.0 | 5.0 | — |
| SrO | — | — | — | — | — | — | — | — | 31.6 |
| | 10 | 11 | 12 | 13 | 14 | 15 | 16 | 17 | 18 |
| $SiO_2$ | 66.5 | 73.6 | 69.1 | 80.5 | 71.9 | 53.8 | 59.5 | 55.5 | 68.1 |
| $Na_2O$ | 9.0 | 9.3 | 13.8 | 10.6 | 19.2 | 5.6 | 8.0 | 12.0 | 8.6 |
| BaO | — | — | — | — | — | 40.6 | 32.5 | 32.5 | 23.4 |
| SrO | 24.5 | 17.1 | 17.1 | 8.9 | 8.9 | — | — | — | — |

TABLE I-continued

| | Weight Percent Oxide Composition | | | | | | | | |
|---|---|---|---|---|---|---|---|---|---|
| | 19 | 20 | 21 | 22 | 23 | 24 | 25 | 26 | 27 |
| $SiO_2$ | 53.8 | 77.2 | 71.9 | 68.9 | 74.0 | 73.0 | 69.0 | 65.0 | 72.5 |
| $Na_2O$ | 5.6 | 10.2 | 15.7 | 12.7 | 3.0 | 6.0 | 5.0 | 5.0 | 7.5 |
| $K_2O$ | — | — | — | — | 3.0 | 1.0 | 2.0 | 2.0 | — |
| CaO | — | — | — | — | 20.0 | 20.0 | 20.0 | 20.0 | 20.0 |
| BaO | 40.6 | 12.7 | 12.5 | 18.4 | — | — | — | — | — |
| $TiO_2$ | — | — | — | — | — | — | 4.0 | 8.0 | — |

Table II records a group of compositions utilized as lithium silicate source glasses, expressed in weight percent on the oxide basis as calculated from the batch. It is believed apparent from a study of the table that a wide variety of base glass compositions is suitable. However, to assure the development of a spontaneous opal phase at the reaction interface, the inclusion of at least about 1% $Li_2O$ has been found mandatory. $Li_2O$ contents up to 20% and higher are efficacious but such render the glass quite expensive and the opal development is not substantially improved over that with lower $Li_2O$ contents. Accordingly, between about 3–10% $Li_2O$ is preferred. Lithium aluminosilicate glass constitute the preferred compositions.

The melting and forming procedures employed with the glasses of Table I were also utilized here. Inasmuch as the study of the opal interface was rendered easier where composite buttons were prepared, the customary practice was to pour the base glass, for example a glass from Table I, into a steel mold and then, while the base glass was still in the molten state, to pour the source glass on top thereof.

TABLE II

| | Weight Percent Oxide Composition | | | | | | | | | |
|---|---|---|---|---|---|---|---|---|---|---|
| | 28 | 29 | 30 | 31 | 32 | 33 | 34 | 35 | 36 | 37 | 38 |
| $SiO_2$ | 64.0 | 80.0 | 80.0 | 80.0 | 80.0 | 78.0 | 76.0 | 74.0 | 73.7 | 73.0 | 59.9 |
| $B_2O_3$ | 28.0 | — | — | — | — | — | — | — | — | — | 22.0 |
| $Al_2O_3$ | 4.0 | 7.0 | 7.0 | 7.0 | 7.0 | 7.0 | 7.0 | 7.0 | — | — | 5.1 |
| $Li_2O$ | 4.0 | 13.0 | 11.0 | 9.0 | 7.0 | 13.0 | 13.0 | 13.0 | 6.0 | 16.0 | 4.0 |
| MgO | — | — | 2.0 | 4.0 | 6.0 | 2.0 | 4.0 | 6.0 | 4.3 | — | — |
| $Na_2O$ | — | — | — | — | — | — | — | — | 10.0 | 6.0 | 1.0 |
| CaO | — | — | — | — | — | — | — | — | 6.0 | 5.0 | — |
| $K_2O$ | — | — | — | — | — | — | — | — | — | — | 2.5 |
| BaO | — | — | — | — | — | — | — | — | — | — | 5.5 |
| | 39 | 40 | 41 | 42 | 43 | 44 | 45 | 46 | 47 | 48 | 49 |
| $SiO_2$ | 80 | 80 | 80 | 80 | 80 | 80 | 80 | 80 | 80 | 80 | 80 |
| $B_2O_3$ | 2 | 4 | — | — | — | — | — | — | — | — | — |
| $Al_2O_3$ | 7 | 7 | 7 | 7 | 7 | 7 | 7 | 7 | 7 | — | 5 |
| $Li_2O$ | 11 | 9 | 11 | 9 | 11 | 9 | 7 | 5 | 3 | 2 | 6 |
| $Na_2O$ | — | — | — | — | 2 | 4 | 4 | 6 | 8 | 8 | 3 |
| CaO | — | — | — | — | — | — | — | — | — | 10 | — |
| $K_2O$ | — | — | 2 | 4 | — | — | 2 | 2 | 2 | — | 6 |

The thickness of the reacted interface layer has been observed to be about 0.005–0.02". X-ray diffraction analyses of the opalized layer resulting from the reaction of certain compositions have identified no crystalline phases present. Therefore, it is believed that the opalization at the reaction interface is probably the result of a liquid/liquid phase separation.

Table III lists several alkali-free silicate compositions which can be employed as sink glasses for the $Na_2O$ and/or $K_2O$-RO-$SiO_2$ base glasses of the instant invention. In view of the wide variety of base glass compositions useful as sink glasses, it is believed apparent that the sole vital feature required is the absence of alkaki metal ions. From the standpoint of melting and forming capabilities, as well as with regard to economic considerations, alkaline earth aluminosilicate compositions are generally to be preferred. However, where composite cane samples are fabricated, the lead aluminosilicate glass of Example 51 was best suited therefor in terms of workability and physical properties. Nevertheless, the high cost of such a composition is obvious.

The glasses of Table III were melted and formed utilizing the procedures described above with respect to Tables I and II.

lithium-containing source glass and cooled, the ion exchange of $Li^+$ ions for $Na^+$ and/or $K^+$ ions will result in the development of a crystalline layer.

The interface reaction layer commonly varies between about 10-15 mils, with the thickness not varying substantially in thickness with changes in composition of either the base or source glasses. X-ray diffraction analysis has identified the crystals to be rutile and anatase (polymorphs of $TiO_2$).

TABLE III

| | Weight Percent Oxide Composition | | | | | | | | | | |
|---|---|---|---|---|---|---|---|---|---|---|---|
| | 50 | 51 | 52 | 53 | 54 | 55 | 56 | 57 | 58 | 59 | 60 |
| $SiO_2$ | 35.0 | 36.0 | 42.0 | 32.0 | 50.0 | 39.5 | 37.40 | 33.8 | 45.0 | 33.49 | 40 |
| $Al_2O_3$ | 10.0 | 7.0 | 20.0 | 39.0 | 10.0 | 8.0 | 10.47 | 1.5 | 10.0 | 9.43 | 10 |
| CaO | — | — | 38.0 | 29.0 | — | 6.5 | — | 0.5 | — | 4.25 | 10 |
| $B_2O_3$ | 10.0 | — | — | — | 10.0 | 20.0 | 18.94 | 10.2 | 10.0 | 18.87 | — |
| BaO | 45.0 | — | — | — | 30.0 | 15.5 | 5.76 | 42.9 | 30.0 | 5.19 | 40 |
| SrO | — | — | — | — | — | 10.0 | 6.47 | — | — | 9.43 | — |
| $Sb_2O_3$ | — | — | — | — | — | 0.5 | 0.52 | 0.15 | — | 0.47 | — |
| PbO | — | 57.0 | — | — | — | — | 20.44 | — | — | 18.87 | — |
| $ZrO_2$ | — | — | — | — | — | — | — | 5.0 | — | — | — |
| ZnO | — | — | — | — | — | — | — | 1.4 | — | — | — |
| $La_2O_3$ | — | — | — | — | — | — | — | 4.5 | — | — | — |
| $As_2O_3$ | — | — | — | — | — | — | — | 0.05 | — | — | — |
| $TiO_2$ | — | — | — | — | — | — | — | — | 5.0 | — | — |

The opalization developed at the interface between the base and sink glasses is the result of $Na_2O$ and/or $K_2O$ diffusion into the alkali-free glass. As a consequence of that action, the liquidus temperature of the base glass is raised, leading to the development of crystallization. That $Na_2O$ and/or $K_2O$ do, indeed, migrate into the sink glass can be confirmed through electron microprobe analyses. X-ray diffraction analysis of the opalized reaction interface will indicate the presence of cristobalite (a polymorph of $SiO_2$) and/or wollastonite ($CaO.SiO_2$) and other alkaline earth metal silicates.

Base glasses in the $Na_2O$ and/or $K_2O$-$TiO_2$-$SiO_2$ can form spontaneous interface reaction opal phases when brought into contact with a lithium silicate source glass. Operable glasses containing $Na_2O$ as the sole alkali metal oxide consist essentially, in weight percent on the oxide basis, of about 5-45% $Na_2O$, 25-55% $TiO_2$, and 15-70% $SiO_2$. Where $K_2O$ is the sole alkali metal oxide present in the base glass, the composition will consist essentially, in weight percent on the oxide basis, of about 10-60% $K_2O$, 15-50% $TiO_2$, and 20-70% $SiO_2$.

The mechanism underlying the crystallization reaction is not fully understood but the key thereto appears to lie in the exchange of $Li^+$ ions from the source glass with $Na^+$ ions in the base glass as verified by ion and electron microprobe techniques. An examination of FIG. 1 can aid in explaining the reason such an exchange causes crystallization to occur. FIG. 1 illustrates generally the glass-forming regions in the alkali metal-titania-silica system in weight percent after M.D. Beals and J. H. Strimple, "Effects of Titanium Dioxide in Glass", *Glass Industry*, 44, 694 (1963).

It can readily be seen that the glass-forming regions in the $Na_2O$ and $K_2O$ systems are much greater than in the $Li_2O$ system. For example, if a composition such as A in FIG. 1 is considered, it will be recognized that such will be a glass in the $Na_2O$ and $K_2O$ systems, but not in the $Li_2O$ system. Therefore, if the sodium or potassium in a $Na_2O$ and/or $K_2O$-$TiO_2$-$SiO_2$ glass of composition A was totally replaced by lithium, that $Li_2O$-$TiO_2$-$SiO_2$ composition would fall in a nonglass region. Hence, when a molten $Na_2O$ and/or $K_2O$ glass of composition A is placed into contact with a molten Up to about 50% by weight of $B_2O_3$ and up to about 35% by weight of $Al_2O_3$ may be included in the $Na_2O$ and/or $K_2O$-$TiO_2$-$SiO_2$ base glass system to extend the glass-forming and reaction regions thereof, the total $B_2O_3 + Al_2O_3$ not exceeding about 50%. Various other additions are also operable. For example, up to about 35% total of CaO, SrO, BaO, and PbO can be included as can up to about 15% ZnO and up to about 10% MgO. Other glass-forming oxides such as $P_2O_5$ and $GeO_2$ can be present in amounts up to 30% total. However, the sum of all extraneous oxides will not exceed about 50% by weight.

By incorporating substantial amounts of extraneous metal oxides and, in particular $Al_2O_3$, the effective amount of $TiO_2$ required can be reduced to about 5% by weight. In essence, then, the operable ranges of the base glass ingredients will range between about 5-70% $Na_2O$ and/or $K_2O$, 5-55% $TiO_2$, and 20-70% $SiO_2$, with the sum of those three components constituting at least 50% of the total composition.

The thickness of the reaction opalized layer can vary between about 1-25 mils, depending upon the composition of the base glass and source glass. Thus, it appears that an increase of $TiO_2$ in the base glass and/or an increase of $Li_2O$ in the source glass can provide a more pronounced reaction. X-ray diffraction analyses have identified the following crystal phases in the spontaneous opal reaction layers: cristobalite, sodium-aluminum-silicate, potassium-aluminum-silicate, rutile, anatase, and mullite ($3Al_2O_3.2SiO_2$). It is conjectured that $TiO_2$ can be acting as a nucleating agent in certain of those glasses as well as precipitating itself as an integral phase.

Again, the reaction phenomenon is not completely understood although it is believed that an analogy can be drawn between these glasses and the simple ternary system. Thus, the exchange of $Li^+$ ions for $Na^+$ and/or $K^+$ ions across the interface of the molten glasses in considered to comprise the fundamental mechanism. The replacement of $Na^+$ and/or $K^+$ ions with $Li^+$ ions is believed to provide an environment conducive to crystallization in like manner to that discussed in regard to FIG. 1 above.

Table IV reports a group of compositions, expressed in weight percent on the oxide basis, which were employed as base glasses. The melting and forming procedures utilized were those described above. Both hand drawn double-gather cane and composite buttons were fabricated.

on the oxide basis, will range between about 30–60% $Na_2O$ and/or $K_2O$, 10–30% $Al_2O_3$, and 25–45% $SiO_2$. Here, again, various compatible metal oxides such as the alkaline earth metals, PbO, $ZrO_2$, $B_2O_3$, and $P_2O_5$ can be included. $TiO_2$ in an amount of a few percent can be added in its capacity as a nucleating agent.

TABLE IV

Weight Percent Oxide Composition

| | 61 | 62 | 63 | 64 | 65 | 66 | 67 | 68 | 69 | 70 | 71 | 72 |
|---|---|---|---|---|---|---|---|---|---|---|---|---|
| $SiO_2$ | 49.7 | 45.6 | 37.2 | 60 | 40 | 25 | 30 | 31.5 | 29.7 | 28.5 | 29.7 | 29.7 |
| $Na_2O$ | 7.5 | 31.5 | — | 10 | 20 | 25 | 40 | 24.8 | 23.4 | 26.1 | 23.4 | 23.4 |
| $K_2O$ | — | — | 18.6 | — | — | — | — | — | — | — | — | — |
| $TiO_2$ | 12.0 | 7.6 | 38.0 | 30 | 40 | 50 | 30 | 33.7 | 31.9 | 40.4 | 31.9 | 31.9 |
| $Al_2O_3$ | 2.4 | 15.2 | 0.5 | — | — | — | — | — | — | — | — | — |
| $B_2O_3$ | 28.4 | — | 5.7 | — | — | — | — | — | — | — | — | — |
| MgO | — | — | — | — | — | — | — | — | — | 5 | — | — |
| CaO | — | — | — | — | — | — | — | — | — | — | — | 15 |
| BaO | — | — | — | — | — | — | — | — | — | — | 15 | — |
| ZnO | — | — | — | — | — | — | — | 10 | — | — | — | — |
| PbO | — | — | — | — | — | — | — | — | 15 | — | — | — |

| | 73 | 74 | 75 | 76 | 77 | 78 | 79 | 80 | 81 | 82 | 83 | 84 |
|---|---|---|---|---|---|---|---|---|---|---|---|---|
| $SiO_2$ | 29.7 | 25 | 30 | 60 | 51.7 | 40.0 | 40.0 | 53.5 | 52.3 | 41.3 | 33.3 | 32.4 |
| $Na_2O$ | 23.4 | — | — | — | 9.4 | 40.0 | 40.0 | 13.8 | 13.5 | 31.5 | 31.5 | 48.6 |
| $K_2O$ | — | 30 | 55 | 10 | — | — | — | — | — | — | — | — |
| $TiO_2$ | 31.9 | 45 | 15 | 30 | 6.0 | 4.0 | 12.0 | 10.0 | 12.0 | 12.0 | 20.0 | 10.0 |
| $Al_2O_3$ | — | — | — | — | — | 16.0 | 8.0 | 22.7 | 22.2 | 15.2 | 15.2 | 9.0 |
| $B_2O_3$ | — | — | — | — | 32.9 | — | — | — | — | — | — | — |
| SrO | 15 | — | — | — | — | — | — | — | — | — | — | — |

| | 85 | 86 | 87 | 88 | 89 | 90 | 91 | 92 | 93 | 94 | 95 |
|---|---|---|---|---|---|---|---|---|---|---|---|
| $SiO_2$ | 29.7 | 37.8 | 40.0 | 29.5 | 34.4 | 35.0 | 28.5 | 29.5 | 34.5 | 30.0 | 23.7 |
| $Na_2O$ | 40.5 | 27.0 | 32.0 | 30.5 | 35.6 | 28.0 | 30.0 | 30.5 | 24.0 | 27.0 | 25.0 |
| $TiO_2$ | 10.0 | 10.0 | 20.0 | 20.0 | 30.0 | 30.0 | 40.0 | 40.0 | 40.0 | 40.0 | 50.0 |
| $Al_2O_3$ | 19.8 | 25.2 | 8.0 | 20.0 | — | 7.0 | 1.5 | — | 1.5 | 3.0 | 1.3 |

Figure 2:

FIG. 2 is an electron micrograph of the reaction layer taken perpendicular to the direction of draw of a piece of double-gathered cane (the white bar at the base of the photograph represents one micron). Beginning at the lower left of the micrograph and advancing to the upper right, the features that can be seen are: (1) the lithium-containing source glass (Example 28); (2) the interface; (3) the crystalline reaction layer; and (4) the base glass (Example 61).

As can be observed, the majority of the crystals appears to be aligned in parallel relation to the direction in which the cane was drawn. The rutile crystals can be seen in cross section in the form of parallelograms and the anatase crystals as square cross sections of tetragonal dipyramids. The reason for the rutile crystals being farther from the interface than the lower temperature anatase has not been resolved, since the rutile crystals must develop first when the glasses are at a higher temperature.

This parallel alignment of the titania crystals is of practical significance in two respects. First, the mechanical strength of the composite can be enhanced thereby. Second, the presence of the aligned crystals can provide a polarizing effect upon visible radiations being transmitted through the composite.

Figure 3:
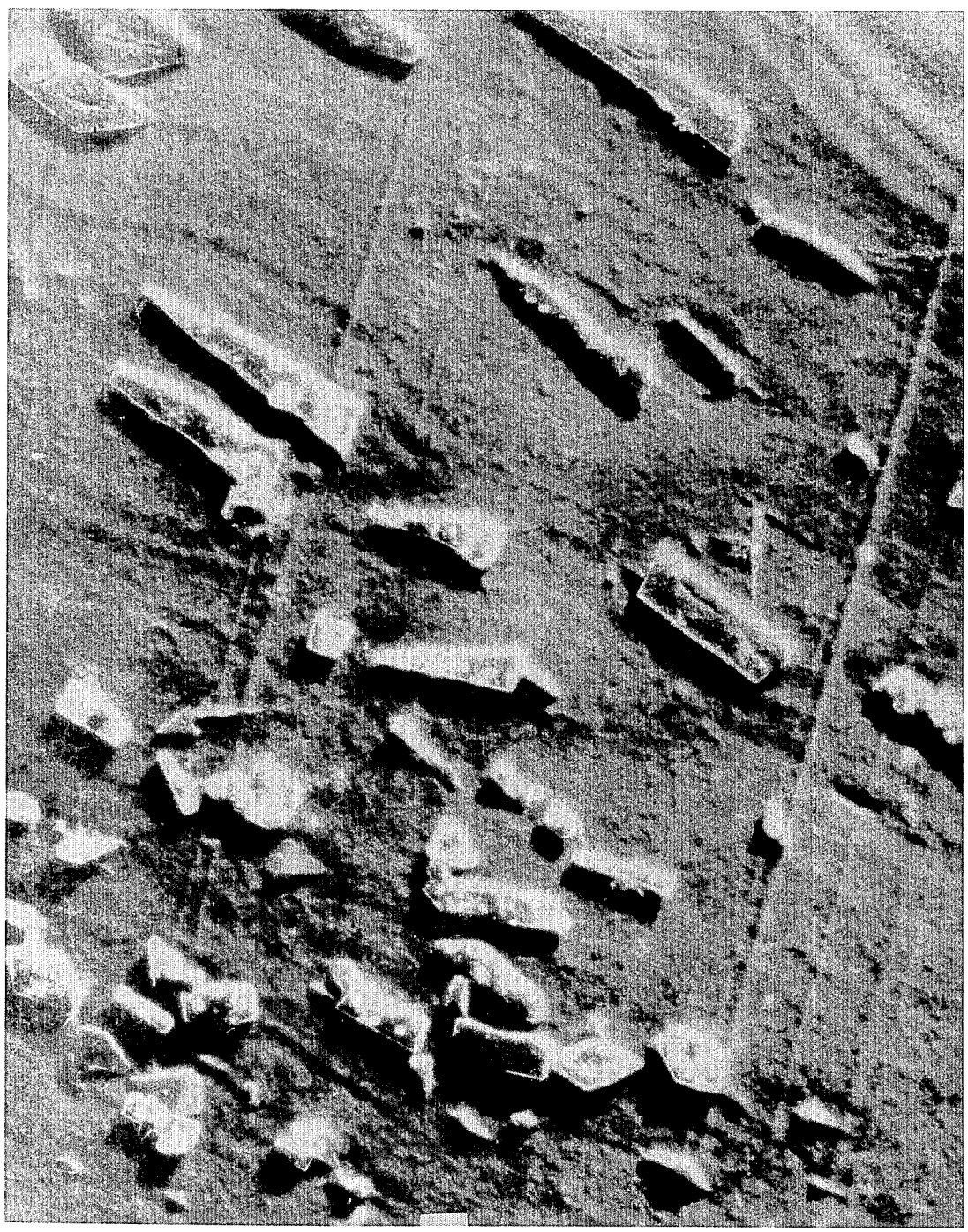

FIG. 3 provides another view of the reaction layer parallel to the direction of draw. The interface between the glasses is out of the view of the micrograph at the bottom left. Broken rutile crystals can be seen therein which are believed to have probably been formed before the glass had been drawn and broken in the drawing process.

Base glasses in the $Na_2O$ and/or $K_2O$-$Al_2O_3$-$SiO_2$ system can form spontaneous interface reaction opal phases with a lithium silicate source glass. In general, the operable compositions, expressed in weight percent However, the total of all such additions will preferably not exceed about 20% by weight.

The thickness of the opalized reaction layer has been observed to vary between about 1–25 mils, this being a function of the compositions of the individual laminae. X-ray diffraction analyses have indicated such following crystal phases as cristobalite, sodium-aluminum-silicate, potassium-aluminum-silicate, and mullite in the reaction layer.

Table V lists three compositions, expressed in weight percent on the oxide basis, which served as operable base glasses. The melting and forming procedures employed were similar to those outlined above with respect to Tables I–IV.

TABLE V

| | 96 | 97 | 98 |
|---|---|---|---|
| $SiO_2$ | 40.0 | 29.2 | 36.9 |
| $Al_2O_3$ | 20.0 | 16.7 | 25.0 |
| $Na_2O$ | 40.0 | 54.2 | 38.1 |

Although the utilization of fluorine-containing batch materials requires anti-pollution devices to remove fluorine from the atmosphere as it is being volatilized during the melting step, the presence of fluorine in the glass can provide for a spontaneous interface reaction with a lithium-containing source glass in a relatively wide range of base glass compositions.

Table VI lists several fluorine-containing base glass compositions in the $Na_2O$ and/or $K_2O$-$B_2O_3$-$SiO_2$ system which have formed spontaneous interface reaction opalization with lithium-containing source glass Example 29. The compositions are reported in terms of weight percent on the oxide basis as calculated from the batch. X-ray diffraction analyses have indentified lithium fluoride (LiF) to be the opal phase of the composite body. This crystallization is believed to be the result of the exchange of lithium ions for sodium and/or potassium ions across the interface. In general, the depth of the crystallization will range about 1–15 mils.

Since it is not known with which cation the fluorine is combined, it is reported as fluoride in accordance with conventional glass analysis practice. To illustrate the extent of fluorine volatilization with those compositions in the melting and forming procedure described above, fluoride as included in the batch (B) and as analyzed in the glass (A) are recorded.

The occurrence of an interface reaction opal phase and whether the base glass demonstrated an opal phase prior to bringing it into contact with the source glass are also noted.

tion opalization with lithium silicate glass Example 29. As was the case with glasses reported in Table VI above, the compositions are tabulated in terms of weight percent on the oxide basis as calculated from the batch. And, similarly to the examples of Table VI, lithium fluoride, resulting from the exchange of sodium and/or potassium ions, has been identified as the opal phase. The depth of the crystallization again ranges between about 1–15 mils.

TABLE VII

| | Weight Percent Oxide Composition | | | | |
|---|---|---|---|---|---|
| | 114 | 115 | 116 | 117 | 118 |
| $SiO_2$ | 72.4 | 70.4 | 70.0 | 72.1 | 65.5 |
| $K_2O$ | — | — | — | 2.0 | — |
| $Na_2O$ | 7.0 | 9.0 | 5.1 | 4.9 | 12.1 |
| CaO | 20.0 | 20.0 | 20.3 | 19.8 | 19.4 |
| $TiO_2$ | — | — | 4.0 | — | — |
| F (B) | 0.6 | 0.6 | 0.6 | 1.2 | 3.0 |
| Appearance | opal | clear | opal | opal | clear |
| Interface | yes | yes | yes | yes | yes |

| | 119 | 120 | 121 | 122 | 123 | 124 | 125 | 126 | 127 | 128 |
|---|---|---|---|---|---|---|---|---|---|---|
| $SiO_2$ | 68.0 | 77.7 | 72.8 | 77.7 | 75.6 | 75.2 | 74.4 | 73.3 | 74.6 | 75.8 |
| $K_2O$ | — | — | — | — | 0.5 | 0.5 | 0.5 | 0.5 | — | — |
| $Na_2O$ | 14.5 | 9.7 | 14.5 | 14.5 | 13.0 | 12.9 | 12.9 | 12.7 | 7.8 | 10.2 |
| MgO | — | — | — | — | 3.5 | 3.5 | 3.4 | 3.3 | 14.8 | 10.9 |
| $Al_2O_3$ | — | — | — | — | 1.5 | 1.5 | 1.5 | 1.5 | — | — |
| CaO | 14.5 | 9.7 | 9.7 | 4.8 | 4.9 | 4.9 | 4.9 | 4.8 | — | — |
| $TiO_2$ | — | — | — | — | — | — | — | — | — | — |
| F (B) | 3.0 | 2.9 | 3.0 | 3.0 | 1.0 | 1.5 | 2.4 | 3.9 | 2.9 | 2.9 |
| Appearance | clear | opal | opal | opal | clear | clear | clear | opal | opal | clear |
| Interface | yes | yes | yes | yes | no | yes | yes | yes | yes | yes |

| | 129 | 130 | 131 | 132 | 133 | 134 | 135 | 136 | 137 | 138 |
|---|---|---|---|---|---|---|---|---|---|---|
| $SiO_2$ | 71.0 | 79.8 | 73.8 | 56.0 | 60.3 | 72.7 | 69.8 | 48.7 | 53.9 | 66.9 |
| $Na_2O$ | 15.2 | 10.0 | 19.7 | 10.4 | 13.0 | 15.9 | 18.7 | 9.0 | 11.7 | 17.9 |
| MgO | 10.9 | 7.3 | 3.6 | — | — | — | — | — | — | — |
| SrO | — | — | — | 30.7 | 23.8 | 8.5 | 8.6 | — | — | — |
| BaO | — | — | — | — | — | — | — | 39.4 | 31.5 | 12.3 |
| F (B) | 2.9 | 2.9 | 2.9 | 2.9 | 2.9 | 2.9 | 2.9 | 2.9 | 2.9 | 2.9 |
| Appearance | clear | clear | clear | clear | clear | opal | clear | clear | clear | clear |
| Interface | yes | yes | yes | yes | yes | yes | yes | yes | yes | yes |

Examples 99–113 illustrate the rather broad ranges in composition that are operable in the $Na_2O$ and/or $K_2O$-$B_2O_3$-$SiO_2$ system. In general, the individual components will range between about 3–15% $Na_2O$ and/or $K_2O$, 5–30% $B_2O_3$, 55–80% $SiO_2$, and 1–15% F. The addition of $Al_2O_3$ was made for its known influence

TABLE VI

| | Weight Percent Oxide Composition | | | | | | | | | |
|---|---|---|---|---|---|---|---|---|---|---|
| | 99 | 100 | 101 | 102 | 103 | 104 | 105 | 106 | 107 | 108 |
| $SiO_2$ | 61.4 | 57.5 | 68.5 | 66.1 | 66.1 | 66.1 | 68.5 | 68.5 | 75.0 | 79.2 |
| $B_2O_3$ | 15.1 | 14.9 | 15.0 | 20.4 | 26.9 | 22.6 | 13.0 | 9.0 | 8.0 | 8.4 |
| $K_2O$ | 10.2 | 10.0 | 10.0 | 6.5 | — | — | 10.0 | 10.0 | 9.8 | 4.9 |
| $Na_2O$ | 3.5 | 3.5 | 3.5 | 3.8 | 3.8 | 8.1 | 3.5 | 3.5 | 5.3 | 5.6 |
| $Al_2O_3$ | — | — | — | — | — | — | 2.0 | 6.0 | — | — |
| F (B) | 9.8 | 14.1 | 3.0 | 3.2 | 3.2 | 3.2 | 3.0 | 3.0 | 1.9 | 1.9 |
| F (A) | 4.25 | 4.36 | 2.73 | — | — | — | 2.38 | 2.47 | — | — |
| Appearance | clear | clear | clear | clear | clear | clear | clear | clear | clear | clear |
| Interface | yes | yes | yes | yes | yes | yes | yes | yes | yes | yes |

| | 109 | 110 | 111 | 112 | 113 |
|---|---|---|---|---|---|
| $SiO_2$ | 72.7 | 63.7 | 64.3 | 67.5 | 57.7 |
| $B_2O_3$ | 11.2 | 11.8 | 11.9 | 13.0 | 19.2 |
| $K_2O$ | 4.9 | 11.0 | 11.2 | 9.6 | — |
| $Na_2O$ | 9.3 | 8.7 | 8.8 | 6.1 | 19.2 |
| CaO | — | — | — | — | — |
| $TiO_2$ | — | — | — | — | — |
| F (B) | 1.9 | 4.8 | 3.8 | 3.8 | 3.9 |
| Appearance | clear | opal | clear | clear | clear |
| Interface | yes | yes | yes | yes | yes |

Table VII records a group of fluorine-containing base glass compositions in the $Na_2O$ and/or $K_2O$-RO-$SiO_2$ system which have formed spontaneous interface reacupon retaining fluorine in the glass. Other compatible metal oxides can be tolerated but the total of all such must be retained below about 20%.

Examples 114-138 demonstrate the wide range of compositions operable as base glasses in the Na$_2$O and-/or K$_2$O-RO-SiO$_2$ system. Hence, although individual amounts of RO will vary somewhat depending upon the presence of MgO, CaO, SrO, and/or BaO as the RO component, the compositions, expressed in weight percent on the oxide basis, will range generally between about 5-25% Na$_2$O and/or K$_2$O, 3-45% RO, wherein RO consists of 3-20% MgO, 3-25% CaO, 3-35% SrO, and 3-40% BaO, 45-85% SiO$_2$, and 0.5-5% F. Here, again, other compatible metal oxides can be included in the base compositions but the total of these ought not to exceed 20% by weight.

Although each of the above working examples described the formation of a single reaction layer between two laminae, it will be appreciated that a multilaminar product can be fabricated wherein two or more reaction interface layers will be produced. As a matter of fact, two layers of opalization have been observed in isolated instances where only two layers of glass are brought into contact with each other. It is believed this phenomenon is due to unusual migration of the reacting ions which, in essence, provides two reaction layers.

Finally, whereas the working examples depict glasses being prepared from individual raw materials, it can be recognized that all or part of the batch can be cullet of the proper composition.

The most desirable composite unit, with respect to the manufacture of envelopes for incandescent lamps, involved a combination of Examples 29 and 100. Such combinations have yielded envelopes fully masking the lighting filaments but wherein the transmission of visible radiations has equalled, and, in some instances, surpassed that of frosted bulbs.

We claim:
1. A laminated glass article consisting of a base glass lamina and a lamina selected from the group consisting of a source glass lamina and a sink glass lamina with an in situ layer of opalization at the interface between said laminae, said base glass being selected from the group of composition fields, expressed in weight percent on the oxide basis:
   a. 2.5-25% of at least one alkali metal oxide selected from the group consisting of Na$_2$O and K$_2$O, 2.5-45% RO, wherein RO consists of CaO, SrO, and BaO and 50-85% SiO$_2$, the sum of alkali metal oxide + RO + SiO$_2$ constituting at least 80% of the total composition;
   b. 5-70% of at least one alkali metal oxide selected from the group consisting of Na$_2$O and K$_2$O, 5-55% TiO$_2$, and 20-70% SiO$_2$, the sum of alkali metal oxide + TiO$_2$ + SiO$_2$ constituting at least 50% of the total composition;
   c. 30-60% of at least one alkali metal oxide selected from the group consisting of Na$_2$O and K$_2$O, 10-30% Al$_2$O$_3$, and 25-45% SiO$_2$, the sum of alkali metal oxide + Al$_2$O$_3$ + SiO$_2$ constituting at least 80% of the total composition;
   c. 3-15% of at least one alkali metal oxide selected from the group consisting of Na$_2$O and K$_2$O, 30% B$_2$O$_3$, 55-80% SiO$_2$, and 1-15% F, the sum of alkali metal oxide + B$_2$O$_3$ + SiO$_2$ + F constituting at least 80% of the total composition; and
   e. 5-25% of at least one alkali metal oxide selected from the group consisting of Na$_2$O and K$_2$O, 3-45% RO, wherein RO consists of MgO, CaO, SrO, and BaO, 45-85% SiO$_2$, and 0.5-5% F, the sum of alkali metal oxide + RO + SiO$_2$ + F constituting at least 80% of the total composition;

said source glass being a lithium silicate composition containing at least 1% Li$_2$O, and said sink glass being an alkali metal-free silicate composition.

2. A laminated glass article according to claim 1 (a) wherein said base glass consists essentially of about 5-20% of at least one alkali metal oxide selected from the group consisting of Na$_2$O and K$_2$O, 2.5-25% CaO, and 60-85% SiO$_2$.

3. A laminated glass article according to claim 1 (a) wherein said base glass consists essentially of about 2.5-25% of at least one alkali metal oxide selected from the group consisting of Na$_2$O and K$_2$O, 2.5-35% SrO, and 55-85% SiO$_2$.

4. A laminated glass article according to claim 1 (a) wherein said base glass consists essentially of about 2.5-25% of at least one alkali metal oxide selected from the group consisting of Na$_2$O and K$_2$O, 2.5-45% BaO, and 50-85% SiO$_2$.

5. A laminated glass article according to claim 1 (a) wherein said base glass contains up to 20% total of Al$_2$O$_3$, B$_2$O$_3$, CdO, P$_2$O$_5$, PbO, and ZnO.

6. A laminated glass article according to claim 1 (b) wherein said base glass consists essentially of about 5-45% Na$_2$O, 25-55% TiO$_2$, and 15-70% SiO$_2$.

7. A laminated glass article according to claim 1 (b) wherein said base glass consists essentially of about 10-60% K$_2$O, 15-50% TiO$_2$, and 15-70% SiO$_2$.

8. A laminated glass article according to claim 1 (b) containing up to 50% total of the following ingredients in the indicated proportion: up to 50% B$_2$O$_3$; up to 35% Al$_2$O$_3$, BaO, CaO, PbO, and SrO; up to 30% P$_2$O$_5$ and GeO$_2$; up to 15% ZnO; and up to 10% MgO.

9. A laminated glass article according to claim 1 (a) wherein said base glass is selected from the composition field alkali metal oxide, RO, and SiO$_2$, the source glass is a lithium silicate composition, and said opalization consists essentially of a liquid-liquid phase separation.

10. A laminated glass article according to claim 1 (a) wherein said base glass is selected from the composition field alkali metal oxide, RO, and SiO$_2$, the sink glass is an alkali metalfree silicate composition, and said opalization consists essentially of at least one of the following crystal phases, cristobalite and alkaline earth metal silicates.

11. A laminated glass article according to claim 1 (b) wherein said base glass is selected from the composition field alkali metal oxide, TiO$_2$, and SiO$_2$, the source glass is a lithium silicate glass, and said opalization consists essentially of at least one of the following crystal phases, cristobalite, sodium-aluminum-silicate, potassium-aluminum-silicate, rutile, anatase, and mullite.

12. A laminated glass article according to claim 1 (c) wherein said base glass is selected from the composition field alkali metal oxide, Al$_2$O$_3$, and SiO$_2$, the source glass is a lithium silicate glass, and said opalization consists esentially of at least one of the following crystal phases, cristobalite, sodium-aluminum-silicate, potassium-aluminum-silicate, and mullite.

13. A laminated glass article according to claim 1 (d) wherein said base glass is selected from the composition field alkali metal oxide, B$_2$O$_3$, SiO$_2$, and F, the source glass is a lithium silicate glass, and said opalization consists essentially of lithium fluoride crystals.

14. A laminated glass article according to claim 1 (e) wherein said base glass is selected from the composition field alkali metal oxide, RO, SiO$_2$, and F, the source glass is a lithium silicate glass, and said opalization consists essentially of lithium fluoride crystals.

* * * * *

UNITED STATES PATENT AND TRADEMARK OFFICE
CERTIFICATE OF CORRECTION

PATENT NO. : 4,009,318

DATED : February 22, 1977

INVENTOR(S) : Thomas H. Elmer, Arthur E. Hillman, Karl E. Hoekstra, Robert G. Howell, Herbert E. Rauscher, and Charles C. Smith, Jr.

It is certified that error appears in the above-identified patent and that said Letters Patent are hereby corrected as shown below:

Column 1, line 49, "3,597,305" should be -- 3,579,305 --.

Column 2, line 45, delete the comma after "batches".

Column 2, line 47, "from" should be -- for --.

Columns 9 and 10, Table VII, Examples 119-128, constituent "cao" should be -- CaO --.

Column 11, Claim 1, line 59, "c" should be -- d --.

Column 11, Claim 1, line 60, "30% $B_2O_3$" should be -- 5-30% $B_2O_3$ --.

Column 12, Claim 10, line 41, "metalfree" should be -- metal-free --.

Column 12, Claim 12, line 56, "esentially" should be -- essentially --.

Signed and Sealed this fifth Day of July 1977

[SEAL]

Attest:

RUTH C. MASON
*Attesting Officer*

C. MARSHALL DANN
*Commissioner of Patents and Trademarks*